United States Patent
Pillai et al.

(10) Patent No.: US 11,062,680 B2
(45) Date of Patent: Jul. 13, 2021

(54) RASTER ORDER VIEW

(71) Applicant: Advanced Micro Devices, Inc., Santa Clara, CA (US)

(72) Inventors: Pazhani Pillai, Tewksbury, MA (US); Christopher J. Brennan, Holden, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/227,588

(22) Filed: Dec. 20, 2018

(65) Prior Publication Data

US 2020/0202815 A1    Jun. 25, 2020

(51) Int. Cl.
*G06T 1/20* (2006.01)
*G06F 9/38* (2018.01)
*G09G 5/18* (2006.01)

(52) U.S. Cl.
CPC ............. *G09G 5/18* (2013.01); *G06F 9/3838* (2013.01); *G06T 1/20* (2013.01)

(58) Field of Classification Search
CPC .... G06F 9/3838; G06F 9/3851; G06F 9/3887; G06T 1/20; G09G 5/18
USPC ......................................................... 345/501
See application file for complete search history.

(56) References Cited

U.S. PATENT DOCUMENTS

| | | | |
|---|---|---|---|
| 7,788,468 B1* | 8/2010 | Nickolls | G06F 9/30087 712/22 |
| 2006/0095908 A1 | 5/2006 | Norton et al. | |
| 2010/0031268 A1* | 2/2010 | Dwyer | G06F 9/3836 718/106 |
| 2019/0121638 A1* | 4/2019 | Knowles | G06F 9/30079 |

FOREIGN PATENT DOCUMENTS

EP    2012233 A2    1/2009

* cited by examiner

*Primary Examiner* — Jacinta M Crawford
(74) *Attorney, Agent, or Firm* — Kowert Hood Munyon Rankin and Goetzel PC; Rory D. Rankin

(57) ABSTRACT

Systems, apparatuses, and methods for implementing raster order view enforcement techniques are disclosed. A processor includes a plurality of compute units coupled to one or more memories. A plurality of waves are launched in parallel for execution on the plurality of compute units, where each wave comprises a plurality of threads. A dependency chain is generated for each wave of the plurality of waves. The compute units wait for all older waves to complete dependency chain generation prior to executing any threads with dependencies. Responsive to all older waves completing dependency chain generation, a given thread with a dependency is executed only if all other threads upon which the given thread is dependent have become inactive. When executed, the plurality of waves generate a plurality of pixels to be driven to a display.

20 Claims, 10 Drawing Sheets

705 → // Assign the concatenation of the current wave and thread number to the variable my_thread_id.
my_thread_id = {my_wave_id, my_thread_in_wave}

710 → // Assign my_thread_id to the pixel dependency data structure at the location (x,y), but only if the current
// thread is the most recent thread to write to location (x,y). Also, assign my_thread_ID to next_thread_Id.
next_thread_id = atomic_max(pixel_dependency[x][y], my_thread_id)

// Check if the thread ID has been added to the pixel dependency data structure. If the thread ID has not been
added to the pixel dependency data structure, traverse the thread dependency linked list to find the correct
location for adding the thread ID.
715 → while(next_thread_id > my_wave_id)
720 →     next_thread_id = atomic_max(thread_dependency[next_thread_id], my_wave_id)

// Assign the next thread to the thread dependency linked list but only if a newer thread has not already been
assigned.
725 → new_next_thread_id = atomic_max(thread_dependency[my_thread_id], next_thread_id)

// Check if the next thread ID has been added to the thread dependency linked list. If the next thread ID has
not been added to the thread dependency linked list, traverse the thread dependency linked list to find the
correct location for adding the next thread ID.
730 → while(new_next_thread_id > next_thread_id)
735 →     new_next_thread_id = atomic_max(thread_dependency[new_next_thread_id], next_thread_id)

*FIG. 7*

```
// Use signed math if the top 2 bits of the wave id are the same, which follows this chart
// 0 to 255:    signed
// 256 to 511:  unsigned
// 512 to 767:  unsigned
// 768 to 1023: signed
bool use_signed_math = ((wave_id & 0x200) == ((wave_id << 1) & 0x200)) ? true : false
```

*1005*

```
// This function performs unsigned atomic max on the image
// We need special handling if value < NULL, since we want NULL to be overwritten
// by the value
uint32 image_umax(uint32 x, uint32 y, uint32 value)
{
   uint32 result
   if(value < NULL) {
      bool retry
      do {
         retry = false
         // next line does the following
         // result = pixel_dependency[x][y]
         // if(pixel_dependency[x][y] == NULL) pixel_dependency[x][y] = value
         result = image_atomic_cmpswap(pixel_dependency[x][y], NULL, value)
         if(result != NULL) {
            // next line does the following
            // result = pixel_dependency[x][y]
            // if(pixel_dependency[x][y] < value) pixel_dependency[x][y] = value
            result = image_atomic_umax(pixel_dependency[x][y], value)
            if(result == NULL) retry = true
         }
      } while(retry)
   } else {
      // next line does the following
      // result = pixel_dependency[x][y]
      // if(pixel_dependency[x][y] < value) pixel_dependency[x][y] = value
      result = image_atomic_umax(pixel_dependency[x][y], value)
   }
   return result
}
```

RASTER ORDER VIEW

BACKGROUND

Description of the Related Art

A graphics processing unit (GPU) is a complex integrated circuit that performs graphics-processing tasks. For example, a GPU executes graphics-processing tasks required by an end-user application, such as a video-game application. GPUs are also increasingly being used to perform other tasks which are unrelated to graphics. In some implementations, the GPU is a discrete device or is included in the same device as another processor, such as a central processing unit (CPU).

In many applications, such as graphics processing applications executed by a GPU, a sequence of work-items, which can also be referred to as threads, are processed so as to output a final result. In one implementation, each processing element executes a respective instantiation of a particular work-item to process incoming data. A work-item is one of a collection of parallel executions of a kernel invoked on a compute unit. A work-item is distinguished from other executions within the collection by a global ID and a local ID. As used herein, the term "compute unit" is defined as a collection of processing elements (e.g., single-instruction, multiple-data (SIMD) units) that perform synchronous execution of a plurality of work-items. The number of processing elements per compute unit can vary from implementation to implementation. A subset of work-items in a workgroup that execute simultaneously together on a compute unit can be referred to as a wavefront, warp, or vector. The width of a wavefront is a characteristic of the hardware of the compute unit. As used herein, a collection of wavefronts are referred to as a "workgroup". Also, a "wavefront" can also be referred to herein as a "wave".

Graphics processors are often used within computer graphics processing systems to create computer-generated imagery from a geometric model. A geometric model defines various objects, details, lighting sources, and other elements of a virtual scene. The computing system determines how to render a given scene based on the geometric model and other inputs from a software application. A GPU process the inputs and the geometric model to generate a two or three dimensional array of pixel color values that represent the desired image or video frame. Typically, a plurality of waves are launched in parallel on the GPU to generate the pixel values for a given image or video frame. However, while the waves are launched in the correct order, due to the nature of the GPU hardware, the waves may get executed out of order.

BRIEF DESCRIPTION OF THE DRAWINGS

The advantages of the methods and mechanisms described herein may be better understood by referring to the following description in conjunction with the accompanying drawings, in which:

FIG. 7 is an example of pseudocode for implementing a raster order view enforcement mechanism in accordance with one implementation.

FIG. 10 is an example of pseudocode for handling wrapping of wave IDs and the NULL value in accordance with one implementation.

DETAILED DESCRIPTION OF IMPLEMENTATIONS

Figure 1:
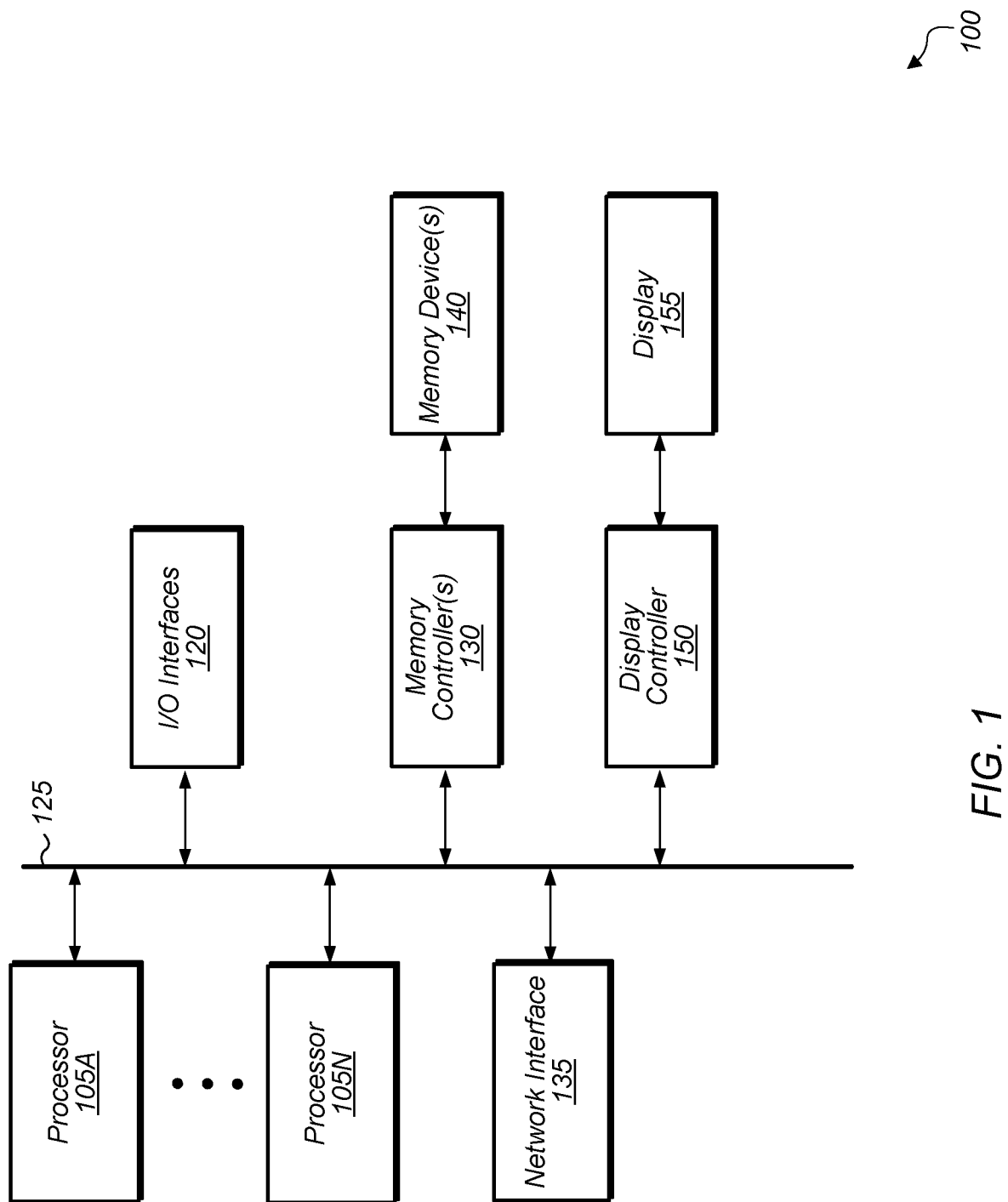
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing raster order view enforcement techniques are disclosed herein. A processor includes a plurality of compute units coupled to one or more memories. A plurality of waves are launched in parallel for execution on the plurality of compute units, where each wave comprises a plurality of threads, and where the waves can execute out-of-order. In one implementation, each wave corresponds to a primitive being rendered. A dependency chain is generated for each wave of the plurality of waves due to the possibility for out-of-order execution. The compute units wait for all older waves to complete dependency chain generation prior to executing any threads with dependencies. Responsive to all older waves completing dependency chain generation, a given thread with a dependency is executed only if all other threads upon which the given thread is dependent have become inactive. When executed, the plurality of waves generate a plurality of pixels to be driven to a display.

In one implementation, generating a dependency chain for a thread involves multiple steps. First, a given pixel being rendered by the thread is identified. Second, an entry for the given pixel in a pixel dependency data structure is located. Third, it is determined if the given thread identifier (ID) of the thread is greater than a thread ID currently stored in the pixel dependency data structure entry. If the given thread ID is greater than a thread ID currently stored in the entry, then an atomic operation is performed to assign the given thread ID to the entry for the given pixel in the pixel dependency data structure. Also, an atomic operation is performed to add a linked list entry to a head of a thread dependency linked list for the given pixel if the given thread ID is greater than the thread ID currently stored in the entry. The given thread ID of the thread is stored in this linked list entry.

In one implementation, if the given thread ID is less than the thread ID currently stored in the entry for the given pixel in the pixel dependency data structure, then the head of the thread dependency linked list for the given pixel is located using a pointer in the entry. Also, an atomic operation is performed to traverse the thread dependency linked list to find where to add a given linked list entry for the given thread ID. Then, an atomic operation is performed to add the given linked list entry for the given thread ID to the thread dependency linked list in a correct location based on a comparison of the given thread ID to other thread IDs in other thread dependency linked list entries for the given pixel.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
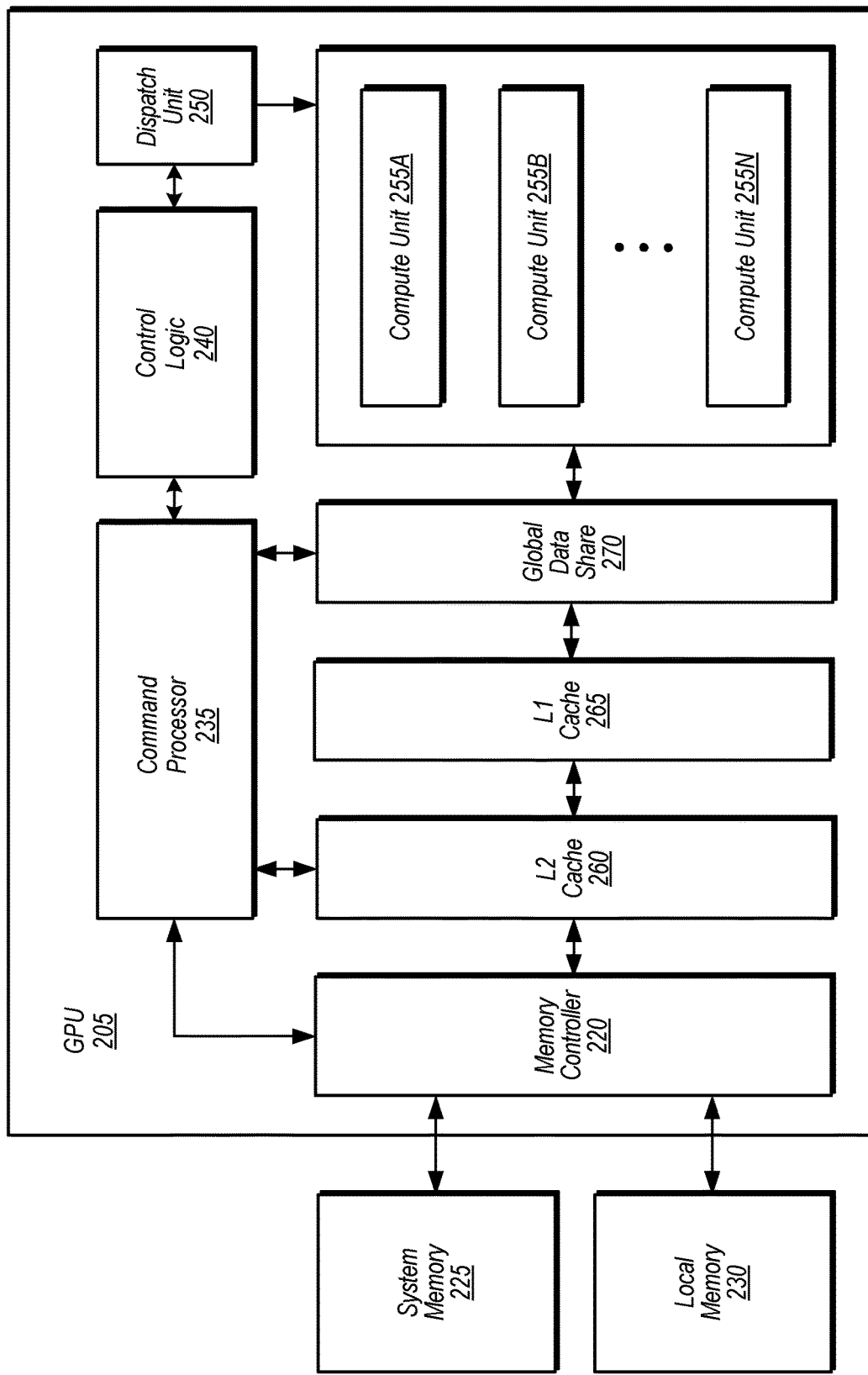
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts (or waves for short) to compute units 255A-N. It is noted that dispatch unit 250 can also be referred to herein as a scheduler. Waves executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

Figure 3:
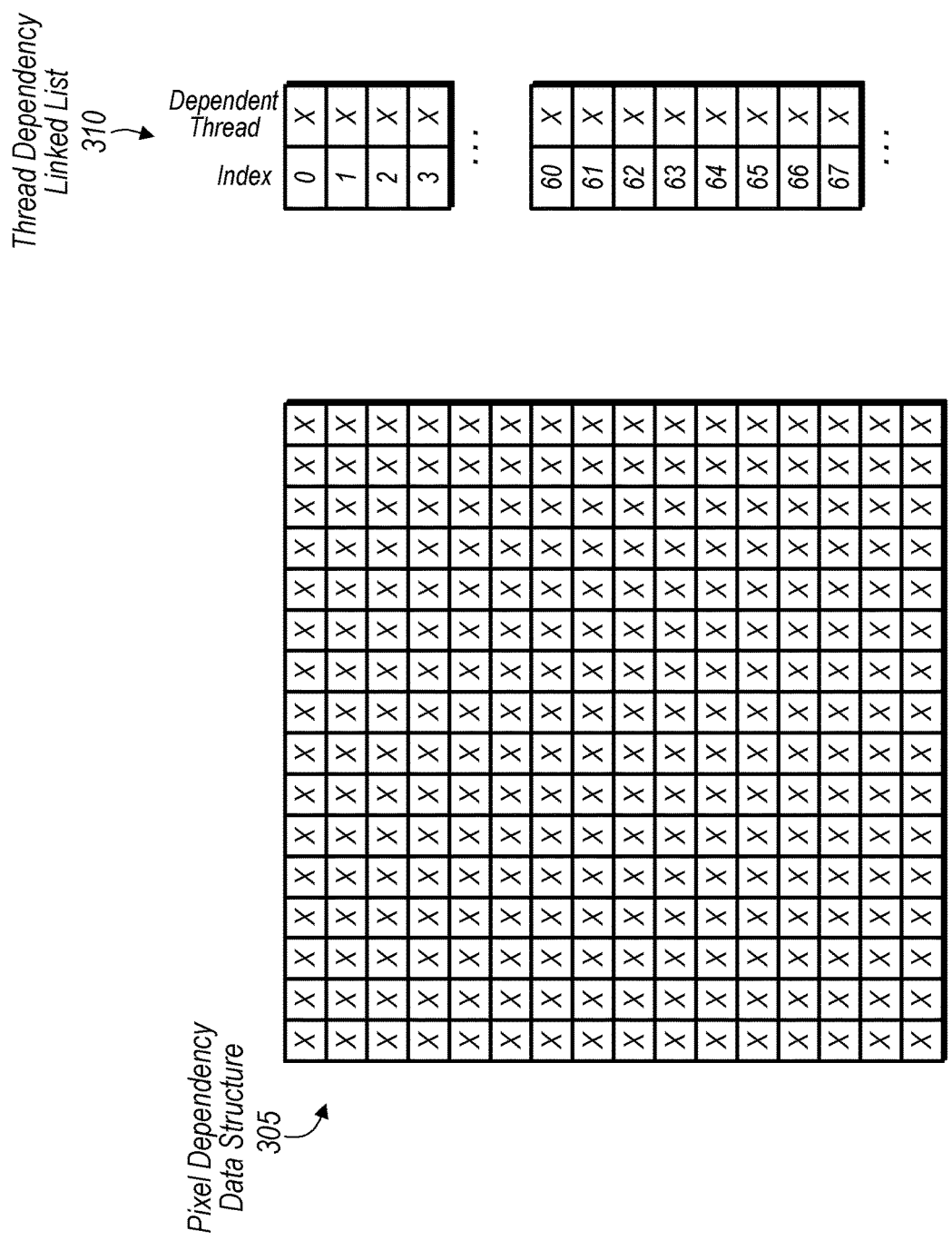
FIG. 3 is a diagram of one implementation of a pixel dependency data structure and a thread dependency linked list.

Referring now to FIG. 3, a diagram of one implementation of a pixel dependency data structure 305 and a thread dependency linked list linked list is shown. In one implementation, pixel dependency data structure 305 is a two-dimensional array which stores an index for each thread which is writing to a pixel within a corresponding surface. In one implementation, pixel dependency data structure 305 is 256-by-256 and is indexed by the 8 least significant bits (LSBs) of the X and Y coordinate of each pixel. In this implementation, pixels on the actual surface alias every 256 pixels in the X and Y directions. This aliasing results in functionally correct but conservative dependencies and is caused by limiting the footprint of pixel dependency data structure 305 to a fixed size. In other implementations, pixel dependency data structure 305 can be any of various other sizes. Each entry of pixel dependency data structure 305 stores an ID of the latest thread to have written to a given pixel location. Pixel dependency data structure 305 acts as the head of each linked list of thread dependency linked list 310 for a corresponding pixel location. In one implementation, a special NULL value is used to indicate that a pixel has no outstanding threads writing to it.

In one implementation, each entry of thread dependency linked list 310 includes an index field and a dependent thread field to track dependencies between threads that are writing to the same pixel of a given surface. In one implementation, thread dependency linked list 310 is sized to contain one entry per thread per outstanding wave. Each entry of thread dependency linked list 310 stores the ID of the thread that the indexed thread is dependent on. In one implementation, a special NULL value is stored in an entry to indicate that the thread is not dependent on any other threads. Each entry of thread dependency linked list 310 acts as a node in the linked list.

Figure 4:
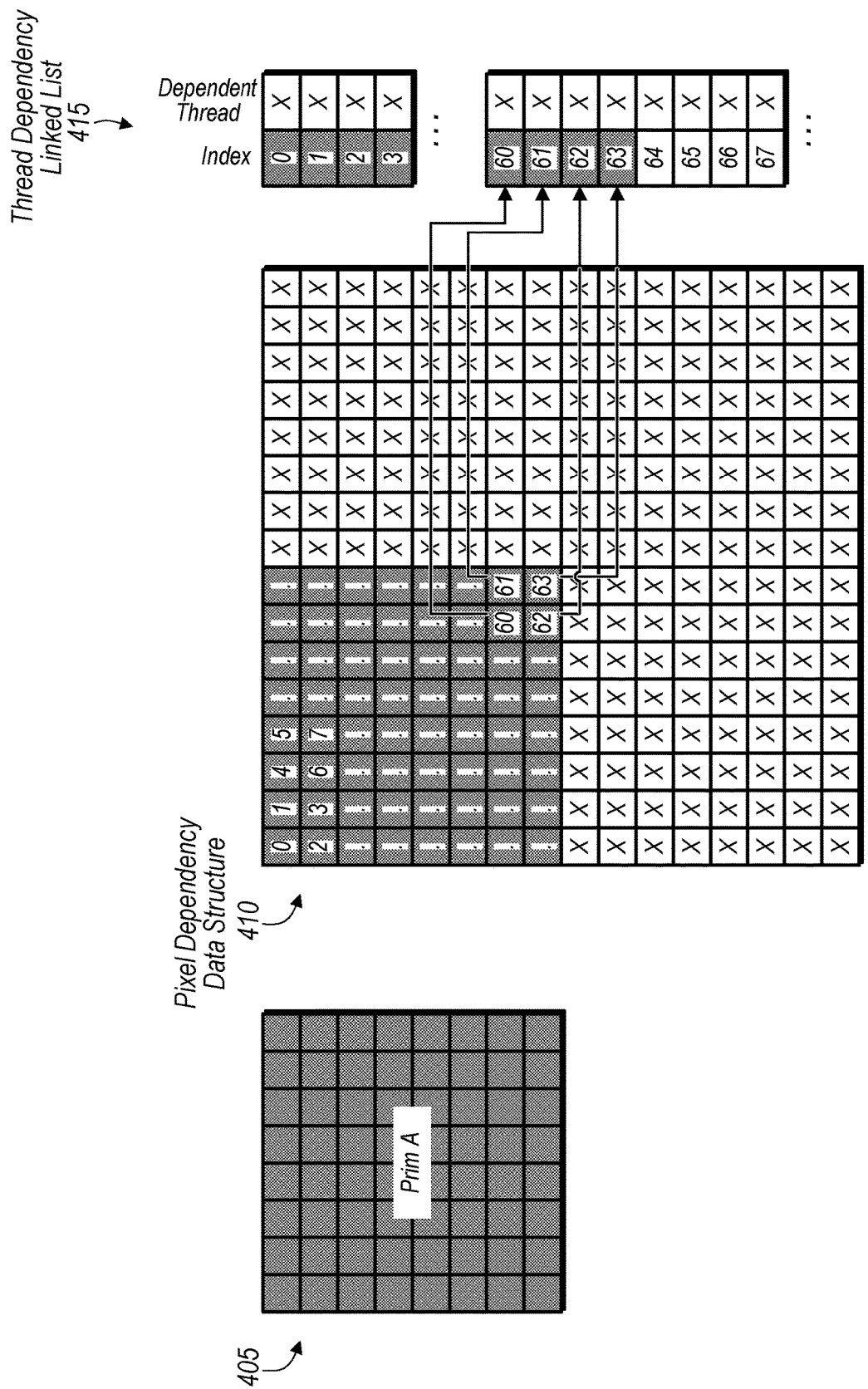
FIG. 4 is a diagram of one implementation of a pixel dependency data structure and thread dependency linked list for a primitive being rendered.

Turning now to FIG. 4, a diagram of one implementation of a pixel dependency data structure 410 and thread dependency linked list 415 for a primitive 405 being rendered is shown. The pixels shown within pixel dependency data structure 410 are labeled from 0 to 63 for the pixels of a primitive 405 being rendered. The top-left pixel is labeled 0 and the bottom right pixel is labeled 63. In one implementation, each pixel is rendered by a separate thread, such that there are 64 threads for rendering the 64 pixels of primitive 405. In one implementation, each pixel of primitive 405 has a corresponding entry in thread dependency linked list 415. The arrows pointing from boxes in pixel dependency data structure 410 to thread dependency linked list 415 illustrate the relationship between entries in pixel dependency data structure 410 and entries in thread dependency linked list 415. It is noted that primitive 405 is also labeled primitive A in FIG. 4.

Figure 5:
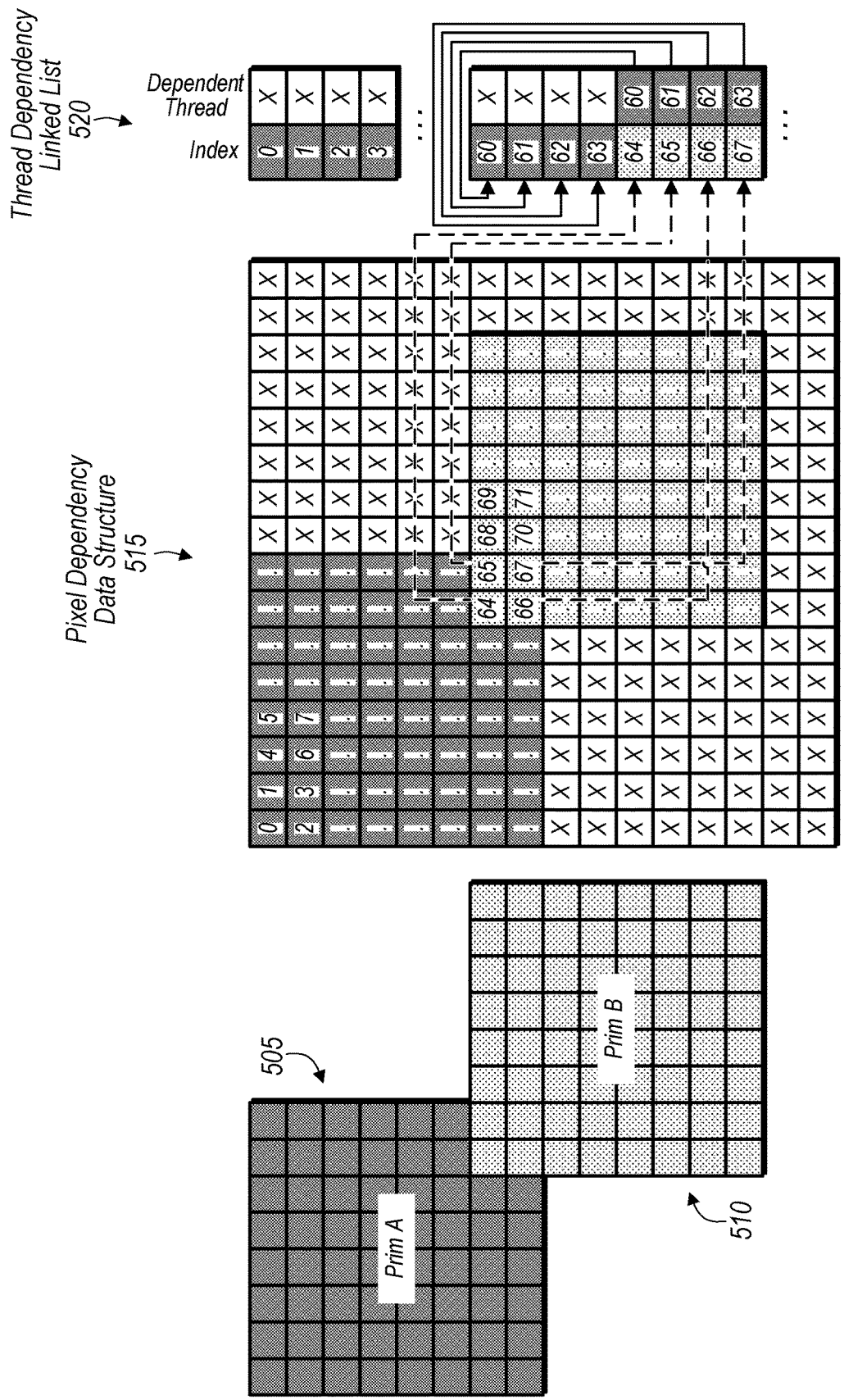
FIG. 5 is a diagram of another implementation of a pixel dependency data structure and a thread dependency linked list for a pair of primitives.

Referring now to FIG. 5, a diagram of another implementation of a pixel dependency data structure 515 and a thread dependency linked list 520 is shown. FIG. 5 is intended to be a continuation of the example illustrated in FIG. 4. Accordingly, primitive 505 is being partially overdrawn by primitive 510 as shown on the left-side of FIG. 5. Primitive 505 is also referred to as primitive A and primitive 510 is also referred to as primitive B. It is assumed for the purposes of this implementation that primitive 510 is being rendered after primitive 505. Boxes within pixel dependency data structure 515 are shaded to indicate the locations corresponding to the pixels of primitive 505 and 510. It is assumed for the purposes of this discussion that pixel indices 64, 65, 66, and 67 of primitive 510 overlap pixel indexes 60, 61, 62, and 63, respectively, of primitive 505. The dependencies between these threads are stored in the four corresponding entries shown for thread dependency linked list 520. Accordingly, there is an entry for thread index 64 which points to thread index 60. This entry will cause thread 64 to wait until thread 60 has finished execution and becomes inactive before thread 64 begins execution. Additionally, there is an entry for thread index 65 pointing to thread index 61, an entry for thread index 66 pointing to thread index 62, and an entry for thread index 67 pointing to thread index 63 to indicate the overlap for the corresponding pixels and dependencies between the threads.

Figure 6:
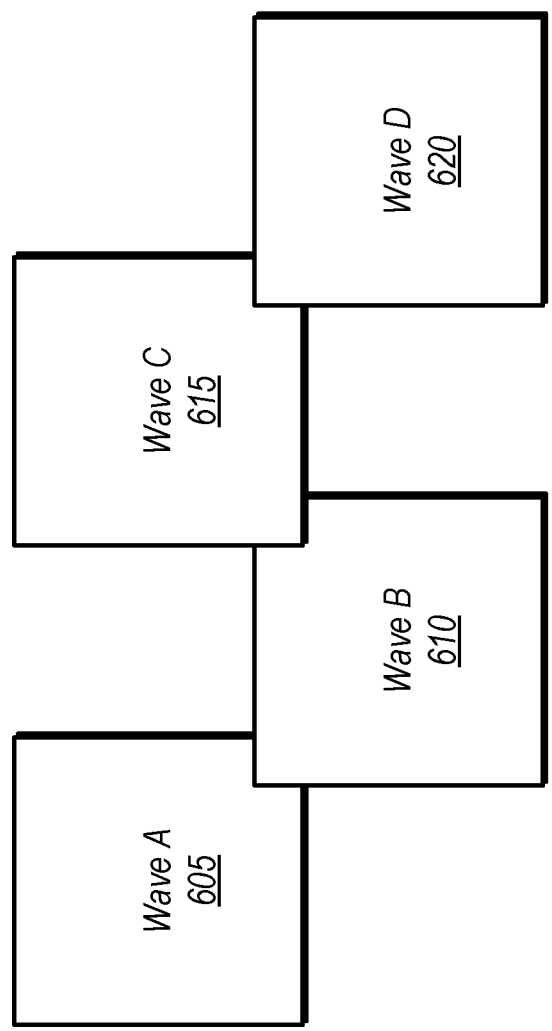
FIG. 6 is a block diagram of one implementation of multiple waves corresponding to overlapping primitives.

Turning now to FIG. 6, a block diagram of one implementation of multiple waves 605, 610, 615, and 620 corresponding to overlapping primitives is shown. Each wave 605, 610, 615, and 620 corresponds to a different primitive A, B, C, and D, respectively. It is assumed for the purposes of this discussion that the order in which the primitives A, B, C, and D are rendered is in alphabetical order such that primitive A will be drawn first, followed by primitive B, then primitive C, and finally primitive D. This is illustrated with the way in which wave 620 overlaps wave 615, wave 615 overlaps wave 610, and wave 610 overlaps wave 605. When waves 605, 610, 615, and 620 are launched for execution, these waves will be launched on the parallel processing unit (e.g., GPU) in the correct order. However, the way in which the threads of these waves execute might not match the way in which the waves were launched since the threads will be executed in a parallel fashion. Accordingly, the previously illustrated data structures are used to ensure that the threads execute in raster order.

For example, in one implementation, entries in a pixel dependency data structure will keep track of the latest thread to write to each pixel of a given surface. The entries of the pixel dependency data structure are updated in an atomic fashion so that multiple threads do not try to update the same entry at the same time. Then, an entry of the pixel dependency data structure is used to locate the head of a corresponding thread dependency linked list for a given pixel. In one implementation, the thread dependency linked list will store the relationship between threads which are drawing overlapping pixels. These entries are created atomically so that multiple threads will not be simultaneously altering the thread dependency linked list. The entries of the thread dependency linked list are used to enforce an ordering of threads which are drawing to the same pixel.

Referring now to FIG. 7, one example of pseudocode 700 for implementing a raster order view enforcement mechanism in accordance with one implementation is shown. In one implementation, pseudocode 700 uses a sequence of atomic operations to build a linked list. This sequencing allows waves hitting the same screen location to interleave without affecting the final results which are generated after all waves have completed. As used herein, the term "atomic operation" is defined as an operation which cannot be interrupted by concurrent operations. Said in another way, an "atomic operation" is an operation that completes, or appears to complete, in a single step relative to other threads.

Instruction 705 assigns a thread identifier (ID) for the current wave and thread to the variable "my_thread_id". In one implementation, the thread ID is the concatenation of the wave ID and the thread number within the wave. In one implementation, the wave ID is a monotonically increasing integer number which is assigned to waves in logical order. Next, instruction 710 assigns the thread ID to the pixel dependency data structure at the pixel location (x,y), but only if the current thread is the latest (i.e., most recent) thread. In one implementation, instruction 710 is implemented using the atomic instruction "atomic_max". In other implementations, instruction 710 can be implemented using other suitable atomic instructions. Atomic_max(pointer, new value) reads the value from the location pointed to by "pointer", computes the maximum of this value and "new value", and then stores the result at the location pointed to by "pointer". Atomic_max(pointer, new value) returns the value from the location pointed to by "pointer".

Next, instruction 715 is a while condition which checks if the thread ID has been added to the pixel dependency data structure. If the thread ID has not been added to the pixel dependency data structure, instruction 720 traverses the thread dependency linked list and adds the thread ID to the thread dependency data structure. The loop of instructions 715 and 720 will not iterate much if waves generally run in order or if there are few instances of overdraw.

Next, instruction 725 assigns the next thread to the thread dependency linked list but only if a newer thread has not already been assigned. It is noted that in some cases, another wave could have come in and updated the thread dependency linked list but with a newer thread. Then, instructions 730 and 735 implement a while loop to check if the next thread ID has been added to the thread dependency linked list. If the next thread ID has not been added to the thread dependency linked list, then the thread dependency linked list is traversed until the next thread ID is added in. Similar to the previous loop for instructions 715 and 720, this loop will not iterate much if waves generally run in order or if there are few instances of overdraw.

Figure 8:
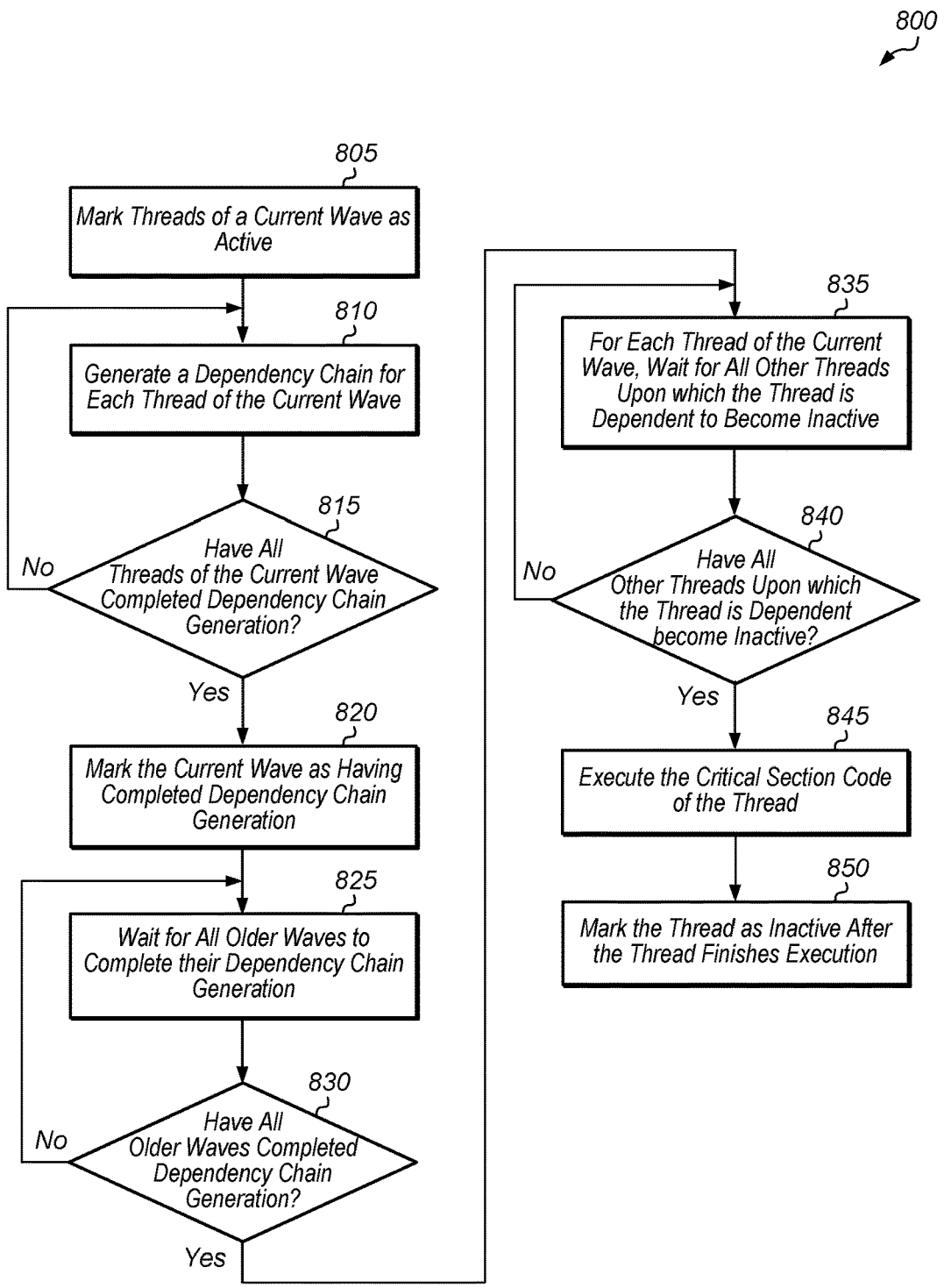
FIG. 8 is a generalized flow diagram illustrating one implementation of a method for implementing a raster order view enforcement mechanism in a multi-threaded environment.
Figure 9:
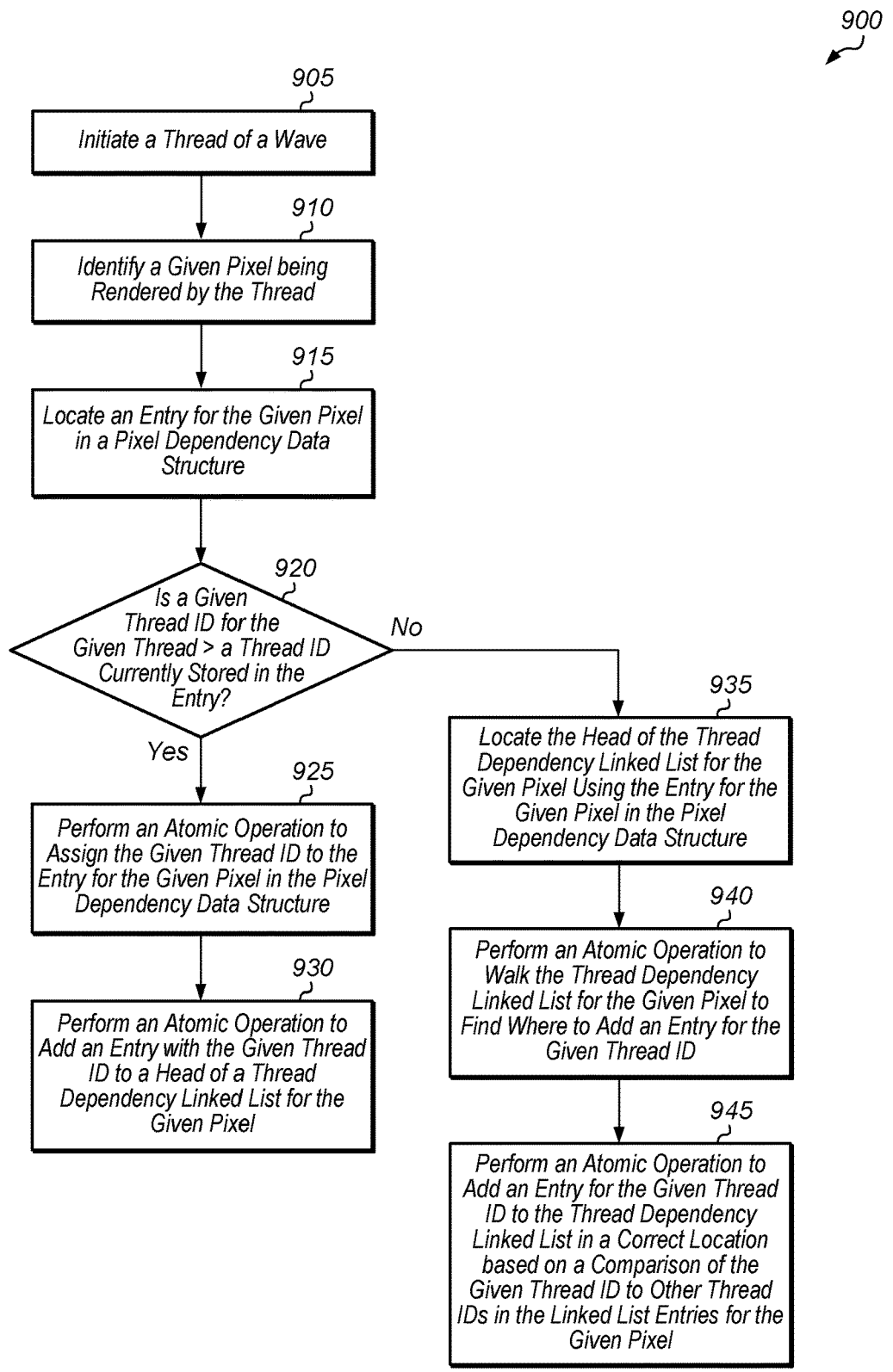
FIG. 9 is a generalized flow diagram illustrating one implementation of a method for performing dependency chain generation.

Turning now to FIG. 8, one implementation of a method 800 for implementing a raster order view enforcement mechanism in a multi-threaded environment is shown. For purposes of discussion, the steps in this implementation and those of FIG. 9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 800.

A processor (e.g., GPU) marks threads of a current wave as active (block 805). It is assumed for the purposes of this discussion that a plurality of waves are launched and being executed in parallel on the processor. Next, a dependency chain is generated for each thread of the current wave (block 810). In one implementation, the dependency chain is generated in an atomic fashion. As used herein, the term "dependency chain" is defined as a linked list tracking the order in which threads that touch (i.e., are rendering) a common pixel are required to execute. One example of generating a dependency chain for a thread is described in further detail below in the discussion associated with method 900 of FIG. 9. If all threads of the current wave have completed dependency chain generation (conditional block 815, "yes" leg), then the current wave is marked as having completed dependency chain generation (block 820). If all threads of the current wave have not completed dependency chain generation (conditional block 815, "no" leg), then method 800 returns to block 810.

After block 820, the current wave waits for all older waves to complete their dependency chain generation (block 825). If all older waves have completed their dependency chain generation (conditional block 830, "yes" leg), then for each thread of the current wave, the thread waits for all other threads upon which the thread is dependent to become inactive (block 835). If not all of the older waves have completed their dependency chain generation (conditional block 830, "no" leg), then method 800 returns to block 825. After block 835, for each thread of the current wave, if all other threads upon which the thread is dependent have become inactive (conditional block 840, "yes" leg), then the thread executes its critical section code (block 845). In one implementation, the critical section code includes instructions for rendering a given pixel. If not all other threads upon which the thread is dependent have become inactive (conditional block 840, "no" leg), then method 800 returns to block 835. After block 845, the thread is marked as inactive after the thread finishes execution (block 850). After block 850, method 800 ends. It is noted that method 800 is performed for each wave of a plurality of waves of a given kernel and/or software application.

Referring now to FIG. 9, one implementation of a method 900 for performing dependency chain generation is shown. A thread of a wave is initiated (block 905). A given pixel being rendered by the thread is identified (block 910). Then, an entry for the given pixel in a pixel dependency data structure is located (block 915). If a given thread ID for the given thread is greater than a thread ID currently stored in the entry (conditional block 920, "yes" leg), then an atomic operation is performed to assign the given thread ID to the entry for the given pixel in the pixel dependency data structure (block 925). In one implementation, the atomic operation is the atomic_max instruction. In other implementations, other types of atomic operations are used for block 925. Also, an atomic operation is performed to add an entry with the given thread ID to a head of a thread dependency linked list for the given pixel (block 930). After block 930, method 900 ends.

If the given thread ID for the given thread is less than the thread ID currently stored in the entry (conditional block 920, "no" leg), then the head of the thread dependency linked list for the given pixel is located using the entry for the given pixel in the pixel dependency data structure (block 935). Next, using an atomic operation, the thread dependency linked list for the given pixel is traversed to find where to add an entry for the given thread ID (block 940). Then, using an atomic operation, an entry for the given thread ID is added to the thread dependency linked list in a correct location based on a comparison of the given thread ID to other thread IDs in the linked list entries for the given pixel (block 945). After block 945, method 900 ends.

Turning now to FIG. 10, one example of pseudocode 1005 and 1010 to handle wrapping of wave IDs and the NULL value in accordance with one implementation is shown. Pseudocode 1005 illustrates one technique for handling wrapping of a wave ID when implementing a raster order view enforcement mechanism. In one implementation, it is assumed that the wave ID is four times larger than the maximum number of waves that can be in-flight. For example, if the maximum number of in-flight waves is 256, then the wave II) would be 10 bits to provide up to 1024 unique wave IDs. When the wave ID is four times larger than the maximum number of waves that can be in-flight, signed and unsigned atomic max and compare functions are used to handle wrapping of the wave ID.

Whether signed or unsigned math is used with the atomic max and compare functions is based on the value of a particular wave ID, as shown in pseudocode 1005. For example, in one implementation, if the current wave ID is in the 0 to 255 range, then all other wave IDs in the data structures can be at most 255 away from the current wave ID. Thus, the other wave IDs will be in the −255 to 511 range. In this case, signed math is used. If the current wave ID is in the 256 to 511 range, valid wave IDs can be anywhere from 0 to 767, and so unsigned math is used. For other values of the current wave ID, this pattern of using signed or unsigned math will be followed. Accordingly, if the top 2 bits of the current wave ID are the same, then signed math is used. Otherwise, if the top 2 bits of the current wave ID are not the same, then unsigned math is used.

Additionally, in one implementation, special handling is utilized to deal with the NULL value. In one implementation, the NULL value is the constant 0x80000000, and so the unsigned atomic max function has to first compare a thread ID to the NULL value before executing the atomic max function as shown in pseudocode 1010. It should be understood that pseudocode 1005 and 1010 are merely examples of code for handling the wrapping of wave Ms and handling the NULL value, respectively, in accordance with one implementation. In other implementations, other arrangements of software instructions and/or software functions can be utilized to handle wave ID wrapping and the NULL value.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more memories; and
a plurality of compute units coupled to the one or more memories, wherein the plurality of compute units are configured to:
launch a plurality of waves for execution in parallel, wherein each wave of the plurality of waves comprises a plurality of threads;
generate a dependency chain for each thread of each wave;
wait for all older waves to complete dependency chain generation prior to executing any threads with dependencies;
responsive to all older waves completing dependency chain generation, execute a given thread with a dependency only if all other threads upon which the given thread is dependent as indicated by a corresponding dependency chain have become inactive, wherein the corresponding dependency chain tracks dependencies between the other threads and the given thread writing to a same pixel of a plurality of pixels; and
execute the plurality of waves to generate the plurality of pixels to be driven to a display.

2. The system as recited in claim 1, wherein the plurality of compute units are further configured to generate a dependency chain for each thread by executing one or more atomic operations.

3. The system as recited in claim 1, wherein generating a dependency chain for a thread comprises:
identifying a given pixel being rendered by the thread;
locating an entry for the given pixel in a pixel dependency data structure;
performing an atomic operation to assign a given thread identifier (ID) to the entry for the given pixel in the pixel dependency data structure responsive to determining that the given thread ID is greater than a thread ID currently stored in the entry, wherein the given thread ID corresponds to the thread; and
performing an atomic operation to add a linked list entry to a head of a thread dependency linked list for the given pixel and store the given thread ID in the linked list entry responsive to determining that the given thread ID is greater than the thread ID currently stored in the entry.

4. The system as recited in claim 3, wherein generating the dependency chain for the thread further comprises:
locating the head of the thread dependency linked list for the given pixel using a pointer in the entry for the given pixel in the pixel dependency data structure responsive to determining that the given thread ID is less than the thread ID currently stored in the entry;
performing an atomic operation to traverse the thread dependency linked list to find where to add a given linked list entry for the given thread ID; and
performing an atomic operation to add the given linked list entry for the given thread ID to the thread dependency linked list in a correct location based on a comparison of the given thread ID to other thread IDs in other thread dependency linked list entries for the given pixel.

5. The system as recited in claim 4, wherein the thread ID is a concatenation of a wave ID and a thread number within a corresponding wave.

6. The system as recited in claim 5, wherein the wave ID is a monotonically increasing integer number.

7. The system as recited in claim 1, wherein the plurality of threads of each wave render a plurality of pixels for a corresponding primitive.

8. A method comprising:
launching, by a plurality of compute units, a plurality of waves for execution in parallel, wherein each wave comprises a plurality of threads;
generating a dependency chain for each thread of each wave of the plurality of waves;
waiting for all older waves to complete dependency chain generation prior to executing any threads with dependencies;
responsive to all older waves completing dependency chain generation, executing a given thread with a dependency only if all other threads upon which the given thread is dependent as indicated by a corresponding dependency chain have become inactive, wherein the corresponding dependency chain tracks dependencies between the other threads and the given thread writing to a same pixel of a plurality of pixels; and
executing the plurality of waves to generate the plurality of pixels to be driven to a display.

9. The method as recited in claim 8, further comprising generating a dependency chain for each thread by executing one or more atomic operations.

10. The method as recited in claim 8, wherein generating a dependency chain for a thread comprises:
identifying a given pixel being rendered by the thread;
locating an entry for the given pixel in a pixel dependency data structure;
performing an atomic operation to assign a given thread identifier (ID) to the entry for the given pixel in the pixel dependency data structure responsive to determining that the given thread ID is greater than a thread ID currently stored in the entry, wherein the given thread ID corresponds to the thread; and
performing an atomic operation to add a linked list entry to a head of a thread dependency linked list for the given pixel and store the given thread ID in the linked list entry responsive to determining that the given thread ID is greater than the thread ID currently stored in the entry.

11. The method as recited in claim 10, wherein generating the dependency chain for the thread further comprises:
locating the head of the thread dependency linked list for the given pixel using a pointer in the entry for the given pixel in the pixel dependency data structure responsive to determining that the given thread ID is less than the thread ID currently stored in the entry;
performing an atomic operation to traverse the thread dependency linked list to find where to add a given linked list entry for the given thread ID; and performing an atomic operation to add the given linked list entry for the given thread ID to the thread dependency linked list in a correct location based on a comparison of the given thread ID to other thread IDs in other thread dependency linked list entries for the given pixel.

12. The method as recited in claim 11, wherein the thread ID is a concatenation of a wave ID and a thread number within a corresponding wave.

13. The method as recited in claim 12, wherein the wave ID is a monotonically increasing integer number.

14. The method as recited in claim 8, wherein the plurality of threads of each wave render a plurality of pixels for a corresponding primitive.

15. An apparatus comprising:
a plurality of compute units; and
a memory for storing dependency chain data structures;
wherein the apparatus is configured to:
  launch a plurality of waves for execution in parallel on the plurality of compute units, wherein each wave comprises a plurality of threads;
  generate a dependency chain for each thread of each wave of the plurality of waves;
  wait for all older waves to complete dependency chain generation prior to executing any threads with dependencies;
  responsive to all older waves completing dependency chain generation, execute a given thread with a dependency only if all other threads upon which the given thread is dependent as indicated by a corresponding dependency chain have become inactive, wherein the corresponding dependency chain tracks dependencies between the other threads and the given thread writing to a same pixel of a plurality of pixels; and
  execute the plurality of waves to generate the plurality of pixels to be driven to a display.

16. The apparatus as recited in claim 15, wherein the plurality of compute units are further configured to generate a dependency chain for each thread by executing one or more atomic operations.

17. The apparatus as recited in claim 15, wherein generating a dependency chain for a thread comprises:
identifying a given pixel being rendered by the thread;
locating an entry for the given pixel in a pixel dependency data structure;
performing an atomic operation to assign a given thread identifier (ID) to the entry for the given pixel in the pixel dependency data structure responsive to determining that the given thread ID is greater than a thread ID currently stored in the entry, wherein the given thread ID corresponds to the thread; and
performing an atomic operation to add a linked list entry to a head of a thread dependency linked list for the given pixel and store the given thread ID in the linked list entry responsive to determining that the given thread ID is greater than the thread ID currently stored in the entry.

18. The apparatus as recited in claim 17, wherein generating the dependency chain for the thread further comprises:
locating the head of the thread dependency linked list for the given pixel using a pointer in the entry for the given pixel in the pixel dependency data structure responsive to determining that the given thread ID is less than the thread ID currently stored in the entry;
performing an atomic operation to traverse the thread dependency linked list to find where to add a given linked list entry for the given thread ID; and
performing an atomic operation to add the given linked list entry for the given thread ID to the thread dependency linked list in a correct location based on a comparison of the given thread ID to other thread IDs in other thread dependency linked list entries for the given pixel.

19. The apparatus as recited in claim 18, wherein the thread ID is a concatenation of a wave ID and a thread number within a corresponding wave.

20. The apparatus as recited in claim 19, wherein the wave ID is a monotonically increasing integer number.

* * * * *